US011532035B2

(12) United States Patent
Trujillo et al.

(10) Patent No.: US 11,532,035 B2
(45) Date of Patent: *Dec. 20, 2022

(54) ATTRIBUTION RULE CONTROLS WITH PAGE CONTENT PREVIEW

(71) Applicant: Target Brands, Inc., Minneapolis, MN (US)

(72) Inventors: Jorge Alberto Trujillo, Minneapolis, MN (US); Dakota Reese Brown, St. Paul, MN (US); Farhan Iqbal, Minneapolis, MN (US); Christopher Edward Johnson, Plymouth, MN (US); Maxwell W. Thyen, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 125 days.

This patent is subject to a terminal disclaimer.

(21) Appl. No.: 16/437,766

(22) Filed: Jun. 11, 2019

(65) Prior Publication Data

US 2019/0295152 A1    Sep. 26, 2019

Related U.S. Application Data

(63) Continuation of application No. 15/168,957, filed on May 31, 2016, now Pat. No. 10,360,622.

(51) Int. Cl.
*G06Q 30/00* (2012.01)
*G06Q 30/06* (2012.01)
*G06F 16/9535* (2019.01)

(52) U.S. Cl.
CPC ..... *G06Q 30/0643* (2013.01); *G06F 16/9535* (2019.01)

(58) Field of Classification Search
CPC .............. G06Q 30/0643; G06F 16/9535
See application file for complete search history.

(56) References Cited

U.S. PATENT DOCUMENTS 5,781,909 A   7/1998  Logan et al.
5,794,257 A   8/1998  Liu et al.
(Continued)

FOREIGN PATENT DOCUMENTS

WO          0146776 A2     6/2001
WO   WO-2009134841 A2 *  11/2009   ........... G06Q 10/087
WO       2012131430 A1    10/2012

OTHER PUBLICATIONS

Eckstein, Raiko, Andreas Henrich, and Nadine Weber. "LFRP-search: multi-layer ranked visual faceted search: an approach to cope with complex search situations." Proceedings of the 2010 ACM Symposium on Applied Computing. (Year: 2010).*

(Continued)

*Primary Examiner* — Matthew E Zimmerman
(74) *Attorney, Agent, or Firm* — Theodore M. Magee; Westman, Champlin & Koehler, P.A.

(57) ABSTRACT

A computer-implemented method includes providing a user interface that allows selection of a product attribute and in the alternative allows selection of a previously defined rule. When a product attribute is selected in the user interface, a rule under construction that describes what products are to appear on a retail webpage is altered based on the selected product attribute. When a previously-defined rule is selected in the user interface, the rule under construction is modified so that the rule under construction uses the selected rule.

6 Claims, 20 Drawing Sheets

(56) References Cited

U.S. PATENT DOCUMENTS

| | | | |
|---|---|---|---|
| 5,809,492 A | 9/1998 | Murray et al. | |
| 6,119,133 A | 9/2000 | Nusbickel et al. | |
| 7,010,742 B1 | 3/2006 | Hsu et al. | |
| 7,249,067 B2 | 7/2007 | Doerksen et al. | |
| 7,996,282 B1* | 8/2011 | Scott | G06Q 30/0603 707/752 |
| 8,312,015 B1 | 11/2012 | Trevelyan | |
| 9,779,065 B1 | 10/2017 | Lee | |
| 10,380,675 B2* | 8/2019 | Osborne | G06Q 30/0643 |
| 2001/0037258 A1 | 11/2001 | Barritz | |
| 2001/0044758 A1* | 11/2001 | Talib | G06Q 10/10 705/26.1 |
| 2002/0194151 A1 | 12/2002 | Fenton et al. | |
| 2003/0154197 A1 | 8/2003 | Millet et al. | |
| 2003/0195810 A1 | 10/2003 | Raghupathy et al. | |
| 2003/0225778 A1* | 12/2003 | Fisher | G06Q 30/0643 707/999.102 |
| 2004/0103042 A1* | 5/2004 | Ryu | G06Q 30/0641 705/27.1 |
| 2004/0133542 A1 | 7/2004 | Doerksen et al. | |
| 2004/0194035 A1 | 9/2004 | Chakraborty | |
| 2005/0010865 A1 | 1/2005 | Kuppusamy et al. | |
| 2005/0108626 A1 | 5/2005 | Ong | |
| 2006/0041553 A1 | 2/2006 | Paczkowski et al. | |
| 2006/0106683 A1 | 5/2006 | Fisher et al. | |
| 2006/0167864 A1 | 7/2006 | Bailey et al. | |
| 2006/0218156 A1* | 9/2006 | Schechinger | G06F 16/951 |
| 2007/0067728 A1 | 3/2007 | Lo et al. | |
| 2007/0179946 A1 | 8/2007 | Wissner-Gross | |
| 2007/0299932 A1 | 12/2007 | Kulkarni | |
| 2008/0109808 A1 | 5/2008 | Wing et al. | |
| 2008/0319976 A1 | 12/2008 | Morris et al. | |
| 2009/0112842 A1 | 4/2009 | Wang et al. | |
| 2009/0138589 A1 | 5/2009 | Wunderlich | |
| 2009/0150345 A1 | 6/2009 | Van Luchene | |
| 2009/0171721 A1 | 7/2009 | LeBaron et al. | |
| 2009/0171813 A1* | 7/2009 | Byrne | G06Q 30/0623 707/999.005 |
| 2009/0319377 A1 | 12/2009 | Gazetova et al. | |
| 2011/0061011 A1 | 3/2011 | Hoguet | |
| 2011/0072338 A1 | 3/2011 | Caldwell | |
| 2011/0208822 A1 | 8/2011 | Rathod | |
| 2011/0276578 A1 | 11/2011 | Allalouf et al. | |
| 2012/0005044 A1 | 1/2012 | Coleman | |
| 2012/0054075 A1 | 3/2012 | Ostroff | |
| 2012/0229500 A1 | 9/2012 | Lamoureux et al. | |
| 2012/0233528 A1 | 9/2012 | Holt et al. | |
| 2013/0031032 A1 | 1/2013 | Mehta et al. | |
| 2013/0031506 A1* | 1/2013 | Diaz | G06Q 50/12 715/781 |
| 2013/0085900 A1* | 4/2013 | Williams | G06Q 30/0601 705/27.2 |
| 2013/0166653 A1 | 6/2013 | Sherrets et al. | |
| 2013/0218859 A1 | 8/2013 | Trevelyan | |
| 2013/0275259 A1 | 10/2013 | Chidambaram | |
| 2013/0339886 A1 | 12/2013 | Batham et al. | |
| 2014/0214588 A1 | 7/2014 | Verchere | |
| 2014/0236917 A1 | 8/2014 | Trevelyan | |
| 2014/0379682 A1 | 12/2014 | Du et al. | |
| 2015/0212989 A1 | 7/2015 | Rice | |
| 2015/0287060 A1 | 10/2015 | Parthasarathy et al. | |
| 2015/0302449 A1* | 10/2015 | Akbarpour | G06Q 30/0643 705/14.23 |
| 2016/0224550 A1 | 8/2016 | Morris | |
| 2016/0357408 A1* | 12/2016 | Zavar | G06Q 30/0603 |
| 2017/0053343 A1* | 2/2017 | Osborne | G06Q 30/0643 |
| 2017/0344525 A1 | 11/2017 | Tully et al. | |
| 2017/0345088 A1 | 11/2017 | Trujillo et al. | |

OTHER PUBLICATIONS

Prosecution history of U.S. Appl. No. 15/168,967 including: Response After Final dated Aug. 1, 2019.

Prosecution history of corresponding U.S. Appl. No. 15/168,957 including the following: Notice of Allowance dated Mar. 26, 2019, Examiner Initiated Interview dated Mar. 26, 2019.

Prosecution history of U.S. Appl. No. 15/168,967 including: Final Rejection dated Jun. 3, 2019, Amendment dated Apr. 4, 2019, Office Action dated Jan. 22, 2019, Amendment dated Oct. 26, 2018, Advisory Action dated Oct. 22, 2019, Examiner Initiated Interview dated Oct. 22, 2018, Response After Final dated Oct. 5, 2018, Final Office Action dated Aug. 8, 2018, Amendment dated Apr. 24, 2018, Applicant initiated interview summary dated Apr. 4, 2018, Office Action dated Jan. 25, 2018.

Oracle E-Business Suite, User's Guide, Release 12.1, Part No. E12896-004, 62 pages, Jun. 2010.

* cited by examiner

900

| ATTRIBUTION BLOCKS displaying 1-91 | | 906 | 908 |
|---|---|---|---|
| NAME ^ | UTILIZATION | LAST MODIFIED | LAST MODIFIED BY |
| A&A Graphic Tees & Tanks | 4 pages | Aug 20, 2015 11:25 AM | |
| Adult Union Suit Sleepwear | 1 page | Nov 24, 2015 7:43 AM | Z001CMV |
| AS-Size Grouping-Toddler (2T-%T) & Infant (12-24 months) | 1 page | Aug 19, 2015 11:31 AM | |
| Audience-Adult | 2 pages | Aug 7, 2015 9:36 AM | |
| Audience-Children | 1 pages | Aug 7, 2015 9:15 AM | |
| Audience-Men | 2 page | Aug 3, 2015 9:14 PM | |
| Audience-Women | 1 pages | Aug 6, 2015 9:08 AM | |
| Back to College-Living Room Furniture | 0 page | Aug 21, 2015 10:21 AM | |
| Basic tees & tanks | 0 pages | Aug 10, 2015 3:22 PM | |
| Business | 0 page | Feb 28, 2016 9:55 PM | test_admin |
| Business | 0 page | Feb 28, 2016 9:55 PM | test_admin |
| Business | 0 pages | Feb 28, 2016 9:55 PM | test_admin |
| Business | 0 pages | Mar 6, 2016 9:51 PM | test_admin |
| Domestic-Basic Bedding | 1 page | Aug 19, 2015 1:18 PM | |
| Domestic-Bath | 5 page | Aug 18, 2015 4:04 PM | |
| Domestic-Fashion Bedding | 1 page | Aug 19, 2015 1:11 PM | |
| Essentials-Baby Products | 0 pages | Aug 6, 2015 11:20 AM | |
| Exercise & Fitness Movies | 1 page | Nov 23, 2015 4:45 PM | Z028979 |
| Fanshop | 612 pages | Mar 9, 2016 2:24 PM | |
| Favorite Characters | 10 page | Aug 7, 2015 9:16 AM | Z050086 |

902: HOME, EXPERIENCE, UTILITIES, TAXONOMY, ATTRIBUTION BLOCKS, FACETS, SETTINGS

☐ HOME
▯ EXPERIENCE
  BROWSE
  SEARCH
  PRODUCT
✿ UTILITIES
  TAXONOMY
  ATTRIBUTION
  BLOCKS
  FACETS
⚙ SETTINGS

≡    ATTRIBUTION BLOCKS > FANSHOP

INSPECTOR    ⌄

38790 RESULTS displaying 1-48

| COLLEGE TEAM 1 | COLLEGE TEAM 2 | COLLEGE TEAM 3 |
|---|---|---|
| COLLEGE TEAM 1 BEACH TOWEL | COLLEGE TEAM 2 BEACH TOWEL | COLLEGE TEAM 3 BEACH TOWEL |
| 10182021 CC | 10182022 CC | 10182031 CC |
| COLLEGE TEAM 1 | COLLEGE TEAM 2 | COLLEGE TEAM 3 |
| COLLEGE TEAM 1 SHOWER CURTAIN | COLLEGE TEAM 2 SHOWER CURTAIN | COLLEGE TEAM 3 SHOWER CURTAIN |

ABOUT
BUSINESS NAME*
FANSHOP
LAST EDIT: JAN 4, 2016 12:09 PM
BLOCK VERSION: 11
REFERENCED BY: NOT REFERENCED
1102 — DELETE    SAVE RULE

1104

PREVIEW A CLAUSE
INCLUDE
ATTRIBUTION BLOCK    ⌄
ATTRIBUTION BLOCK NAME    ⌄
PREVIEW

GROUP 1 - BRAND NAME
MATCH ANY GUEST FACING BRAND
| RACING ASSOC | X |
| PRO BASEBALL | X |
| COLLEGE SPORTS ASSOC | X |

ATTRIBUTION BLOCKS > FANSHOP

INSPECTOR

ABOUT

BUSINESS NAME*
FANSHOP
LAST EDIT: JAN 4, 2016 12:09 PM
BLOCK VERSION: 11

REFERENCED BY:
• BEACH TOWELS
• SHOWER CURTAINS & LINERS

SAVE RULE

PREVIEW A CLAUSE
INCLUDE
ATTRIBUTE GUEST FACING BRAND  v
KEYWORD  v

PREVIEW

GROUP 1 - BRAND NAME
MATCH ANY GUEST FACING BRAND
RACING ASSOC           X
PRO BASEBALL           X
COLLEGE SPORTS ASSOC   X
PRO FOOTBALL           X 1602
1603

1600

38796 RESULTS displaying 1-48

COLLEGE TEAM 1
COLLEGE TEAM 1 BEACH TOWEL
10182021
CC

COLLEGE TEAM 2
COLLEGE TEAM 2 BEACH TOWEL
10182022
CC

COLLEGE TEAM 3
COLLEGE TEAM 3 BEACH TOWEL
10182031
CC

PRO FOOTBALL TEAM 1
PRO FOOTBALL TEAM 1 SHOWER CURTAIN

PRO FOOTBALL TEAM 2
PRO FOOTBALL TEAM 2 SHOWER CURTAIN

PRO FOOTBALL TEAM 3
PRO FOOTBALL TEAM 3 SHOWER CURTAIN

HOME
EXPERIENCE
BROWSE
SEARCH
PRODUCT
UTILITIES
TAXONOMY
ATTRIBUTION BLOCKS
FACETS
SETTINGS

≡ BROWSE > SHOWER CURTAINS & LINERS    BASIC INFO    ATTRIBUTION    PLANOGRAM

⌂ HOME
☐ EXPERIENCE     INSPECTOR ⌄
BROWSE
SEARCH           874 RESULTS displaying 1-48
PRODUCT
✧ UTILITIES
⚙ SETTINGS

| SUPER SOFT VINYL SHOWER LINER - WHITE 10275314 SA | SUPER SOFT VINYL SHOWER LINER - CLEAR 10275314 SA | RUFFLES SHOWER CURTAIN 10275314 SA |

FIND A PAGE ......

ABOUT
LAST MODIFIED BY: TEST USER
LAST EDITED: OCT 12, 2015 4:52 PM
RULE VERSION: 1
STATUS: ACTIVE
NOTES: SHOWER CURTAINS, EXCLUDE FAN SHOP

REMOVE ATTRIBUTION     SAVE RULE

PREVIEW A CLAUSE
INCLUDE ⌄
ATTRIBUTES/VALUES ⌄
ATTRIBUTE ⌄
OPTIONAL VALUE

PREVIEW

ATTRIBUTION BLOCKS
EXCLUDE MATCH ANY BLOCK  } 1404
FANSHOP

SHOWER CURTAINS edit name
MATCH ANY ITEM ATTRIBUTE CATEGORY
SHOWER CURTAINS ✕

ATTRIBUTION RULE CONTROLS WITH PAGE CONTENT PREVIEW

CROSS-REFERENCE TO RELATE APPLICATION

The present application is a continuation of and claims priority of U.S. patent application Ser. No. 15/168,957, filed May 31, 2016, the content of which is hereby incorporated by reference in its entirety.

BACKGROUND

On retail websites a collection of webpages are organized in a taxonomy that describes the relationship between the various webpages. On many of the webpages, collections of products are displayed for purchase. In general, the webpages display content for each product that can include one or more images of the product, a name for the product, a short description of the product and a price for the product. Often, the product content is laid out in a grid pattern on the webpage.

Search engines traverse retail websites and generate an index that describes the content of each of the webpages on the retail website. Thus, the index for a search engine will include the content of the products on the webpages of the retail website. When a user searches for certain product attributes using the search engine, the search engine looks through its index to find any pages that contain references to those attributes. The search engine then returns the pages containing products with the matching attributes. In some search engines, the matching pages are ordered by the search engine based in part on how often past users selected the page when it was presented in a list of search results. Thus, the number of times that a link to a page is selected from a list of search results affects where the page's link appears in later search results.

The discussion above is merely provided for general background information and is not intended to be used as an aid in determining the scope of the claimed subject matter. The claimed subject matter is not limited to implementations that solve any or all disadvantages noted in the background.

SUMMARY

A computer-implemented method includes providing a user interface that allows selection of a product attribute and in the alternative allows selection of a previously defined rule. When a product attribute is selected in the user interface, a rule under construction that describes what products are to appear on a retail webpage is altered based on the selected product attribute. When a previously-defined rule is selected in the user interface, the rule under construction is modified so that the rule under construction uses the selected rule.

In accordance with a further embodiment, a method includes providing a user interface with a preview control and with rule definition controls to define a rule clause that selects products to appear on a retail webpage. An indication that the preview control has been selected is received and in response, the rule clause defined by the rule definition controls is retrieved. Displayable content for products that satisfy the rule clause is requested from a data store and is displayed in the user interface together with the rule definition controls.

In a still further embodiment, a system includes a memory and a processor. The processor performs steps including receiving a list of products to be returned on an indexed webpage that forms part of a website and selecting a product from the list. The processor then determines if the product is to be returned on a second indexed webpage of the website and when the product is to be returned on a second indexed webpage, the processor provides an error message on a user interface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 9 is a user interface for selecting an existing attribution rule block.

FIG. 11 is an example user interface showing an attribution rule block that is not referenced by other rules.

FIG. 12 is an example user interface of the attribution rule block of FIG. 11 after it has been referenced by two rules.

FIG. 14 is an example user interface of a second rule that uses the attribution rule block of FIG. 12.

FIG. 15 is the user interface of FIG. 12 showing a preview of a new clause to be added to the attribution rule block.

FIG. 16 is the user interface of FIG. 15 showing a preview of items returned by the attribution block rule after the addition of the new clause.

FIG. 17 is the user interface of FIG. 13 after the new rule has been added to the attribution rule block.

FIG. 18 is the user interface of FIG. 14 after the new rule has been added to the attribution rule block of FIG. 16.

FIG. 19 is a flow diagram of a method of reducing the number of index pages that a product appears on.

DETAILED DESCRIPTION

Figure 1:
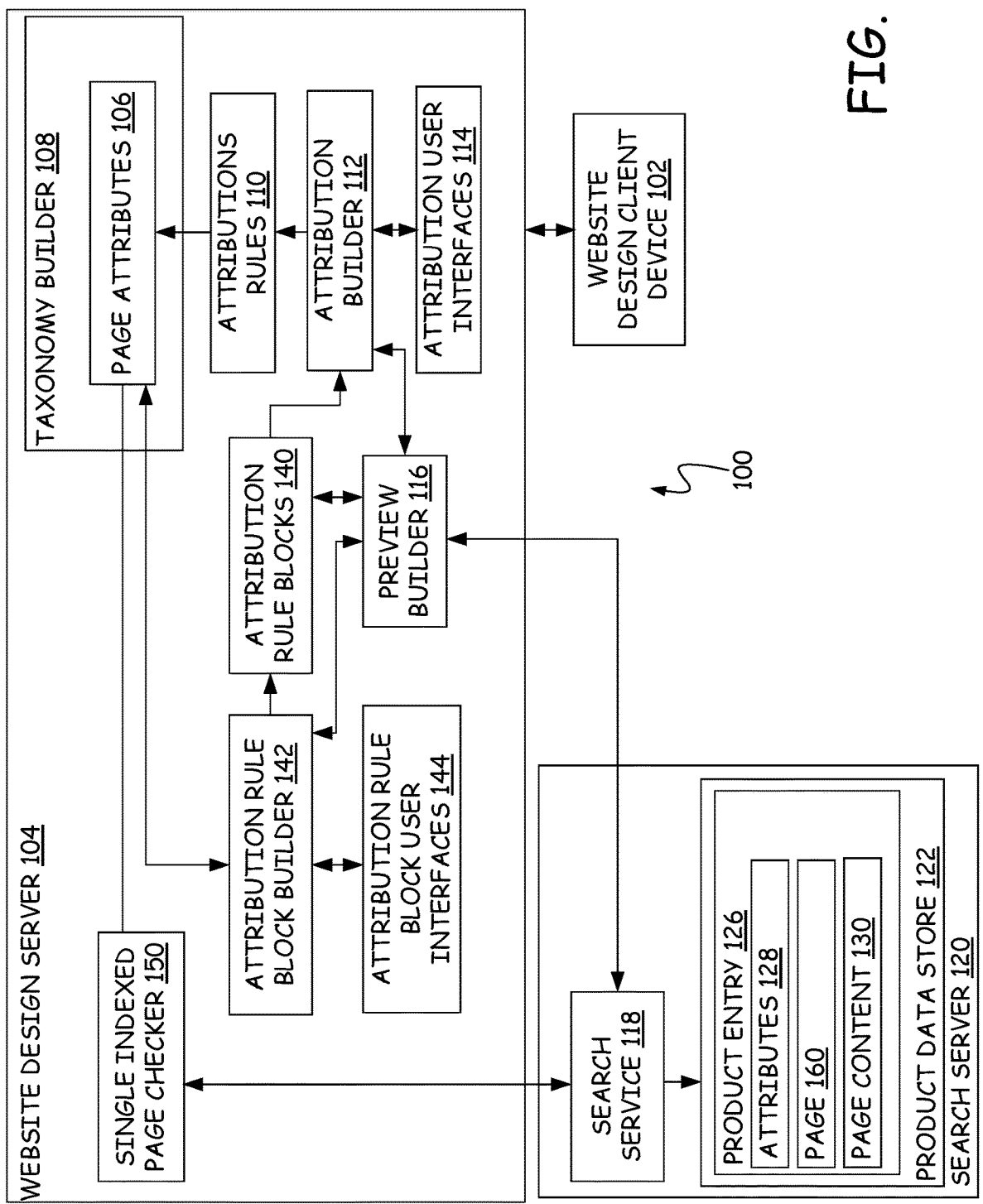
FIG. 1 is a block diagram of a system used in accordance with various embodiments.

When consumers visit retail websites, they are often looking for products that share common attributes. For example, a consumer may visit a retail website looking for women's shirts or looking for mystery books. Because of this, it is beneficial to the consumer if the website provides webpages where products with common attributes can be viewed together. In accordance with the various embodiments, webpages are constructed using a collection of rules that describe the attributes of products that are to appear on the webpage. These rules can be inclusive by requiring a product to have a particular attribute in order to be added to the page or exclusionary by preventing products with particular attributes from appearing on the page. Using such rules, it is difficult to predict what products will appear on the webpage since it is difficult to know the exact attributes of all products that the retailer is selling.

Embodiments described below provide user interfaces that include rule definition tools and preview areas. The rule definition tools allow a webpage designer to define a set of product selection rules for the webpage. The preview area shows a preview of the product content that will appear in the webpage based on the current version of the product selection rules. This allows the webpage designer to quickly assess whether the proper products will be returned for the set of rules they are assigning to the webpage. In addition, various embodiments provide attribution rule blocks that consist of one or more previously defined rules that can be shared by different webpages. When an attribution rule block is edited, the changes to the attribution rule block are automatically propagated to each of the pages that use the attribution rule block. In addition, checks are put in place in the webpage design tool to prevent an attribution rule block from being deleted if at least one webpage uses the attribution rule block.

In large retail websites, it is possible for a product to appear on more than one webpage. If a product appears on more than one webpage that is indexed by a search engine, then different webpages from the same website will be returned in the search results for the product. This results in fewer users selecting each of the search pages since some users will select one page while other users will select another page. As a result, the total selections for each page are lower than if only one page were returned for the product. This causes the search engine to rank each of the pages lower than if only a single page were returned for the website. This makes it more difficult for the user to view the webpages for the website in the search results since the webpages for the website will be pushed lower in the search results and often off of the first screen of the search results.

In accordance with various embodiments discussed below, webpage design tools are provided that limit the number of indexed pages that a product appears on in a retail website. This helps to increase the selection of a webpage in search results and thereby helps to improve the rankings of webpages from the website on the search page.

FIG. 1 provides a block diagram of a system 100 used to design webpages for a website. In FIG. 1, a website design client device 102 communicates with a website design server 104 to set page attributes 106 for a collection of pages on the website that are related to each other through a taxonomy set by a taxonomy builder 108. The page attributes 106 include items such as a default image for the page, whether the page is guest facing so that consumers can view the page, whether the page is indexed such that search engines are allowed to build an index from the page, whether the page includes navigational elements that allow the consumer to refine what appears on the page and attribution rules 110 that define what products are to appear on the webpage. A website designer builds attribution rules 110 through attribution user interfaces 114 that are provided by attribution builder 112 to website design client device 102. Through attribution user interfaces 114, the website designer is able to designate attribution rules for a product page and thereby establish what products are to appear on each page.

Figure 2:
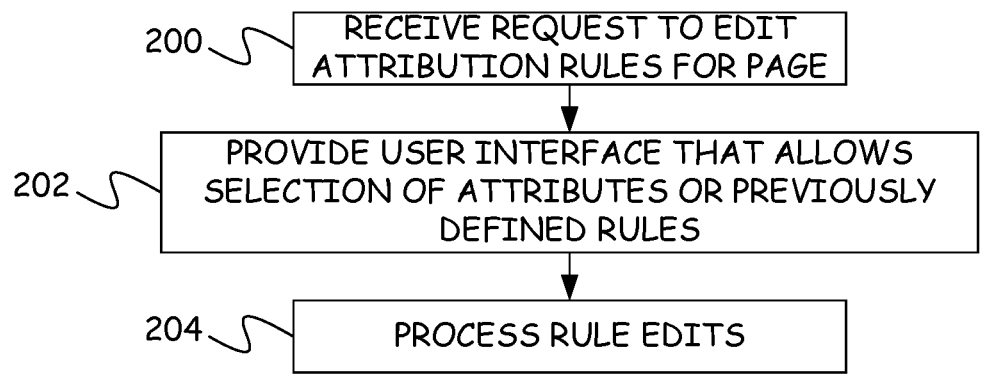
FIG. 2 is a flow diagram of a method of editing attribution rules for a page.

FIG. 2 provides a flow diagram of a method of editing attribution rules for a page. In step 200, attribution builder 112 receives a request to edit attribution rules for a page. In response, attribution builder 112 generates attribution user interface 114 at step 202. As discussed further below, attribution user interface 114 allows the webpage designer to set rules based on product attributes or to select previously defined rules, referred to as attribution rule blocks, as part of the rules for a page.

Figure 4:
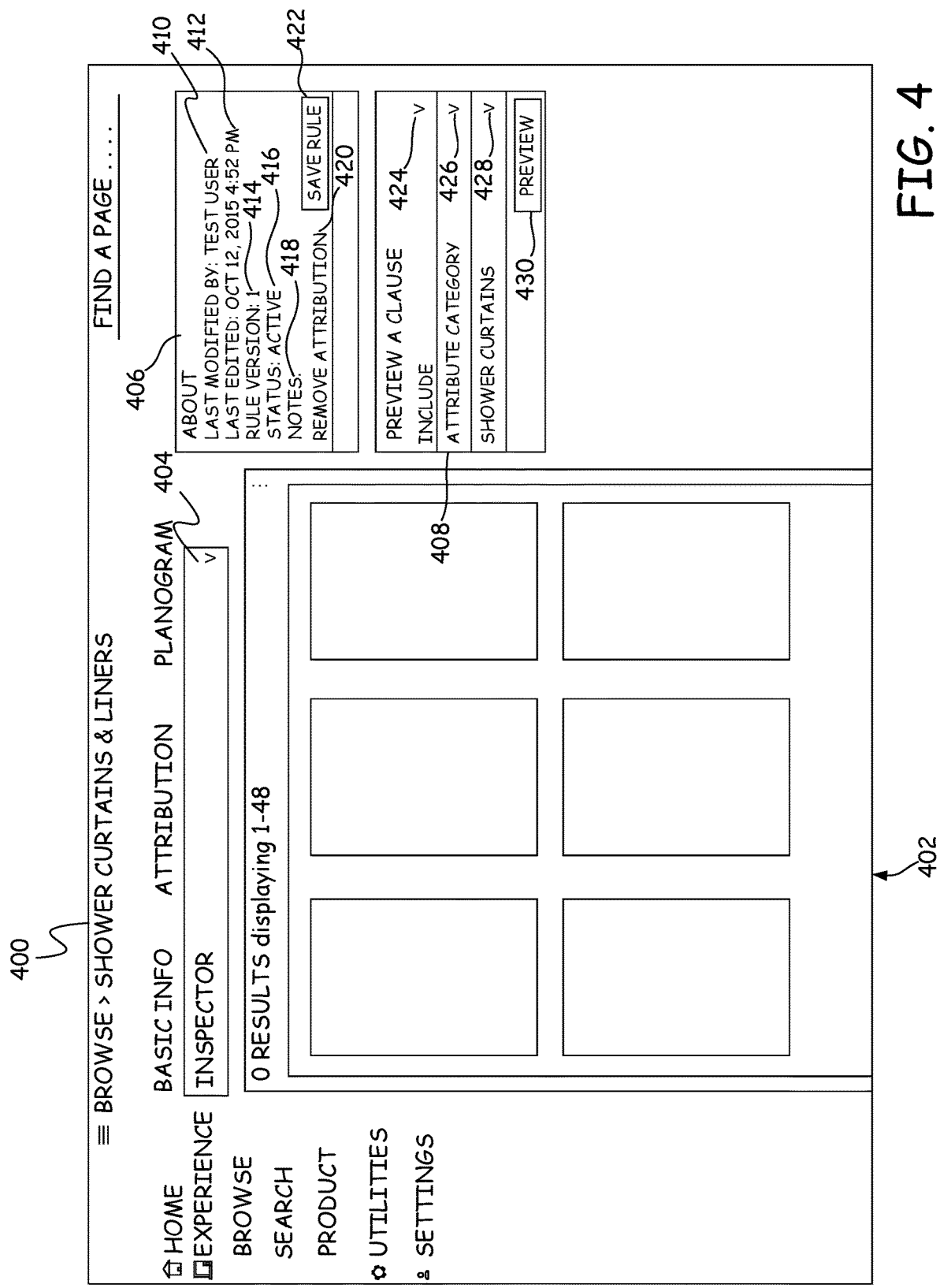
FIG. 4 is an example user interface for constructing a rule clause for a retail webpage.

FIG. 4 provides an example user interface 400, which is one example of attribution user interface 114. In user interface 400, a new page entitled "shower curtains & liners" is being constructed. User interface 400 includes a preview area 402, an inspector pulldown 404, an information box 406 and a preview clause pane 408. Preview area 402 displays product content that will be shown on the webpage based on the attribution rules set for the page. In user interface 400, no attribution rules have been selected yet and as a result, there are 0 results in preview area 402. Inspector 404 provides a pulldown that lists counts for particular attributes of products that match the rules set for the webpage. For example, if the rules return 18 products from the Toys department, inspector 404 would indicate this.

Information area 406 describes information about the attribution rules for the webpage including who last modified the attribution rules 410, when those last modifications occurred 412, the version of the attribution rules that the last modifications represent 414 and whether the attribution rules are currently active or inactive 416. In addition, information box 406 includes a notes area 418 that provides a description of the products that are to be returned by the attribution rules, a remove attribution control 420 that allows all of the attribution rules for the page to be removed and a save rule control 422 that allows the current changes to the attribution rule to be saved.

Preview clause pane 408 allows the webpage designer to enter a new rule clause using a relationship control 424, a merch type attribution/values control 426 and an attribute value/block name control 428. Relationship control 424 allows the designer to select either Include, for inclusive rules, or Exclude, for exclusionary rules. Merch type attribution/values control 426 provides a list of attribute types and an attribution rule block entry that the designer can select from. If the designer selects an attribute type, value/block name control 428 provides a list of possible values for the attribute type and/or a text entry area that accepts a value for the attribute type. If the designer selects the attribution block entry in control 426, value/block name control 428 provides a list of attribution rule blocks that have been defined so that the designer can select one of the attribution rule blocks. Preview clause pane 408 also includes a preview control 430 that causes a pop-up window to be displayed showing product content for products that would be returned for the selected attribute-value pair or the selected attribution block. Note that the same preview is shown regardless of whether Include or Exclude was selected in relationship control 426.

Figure 3:
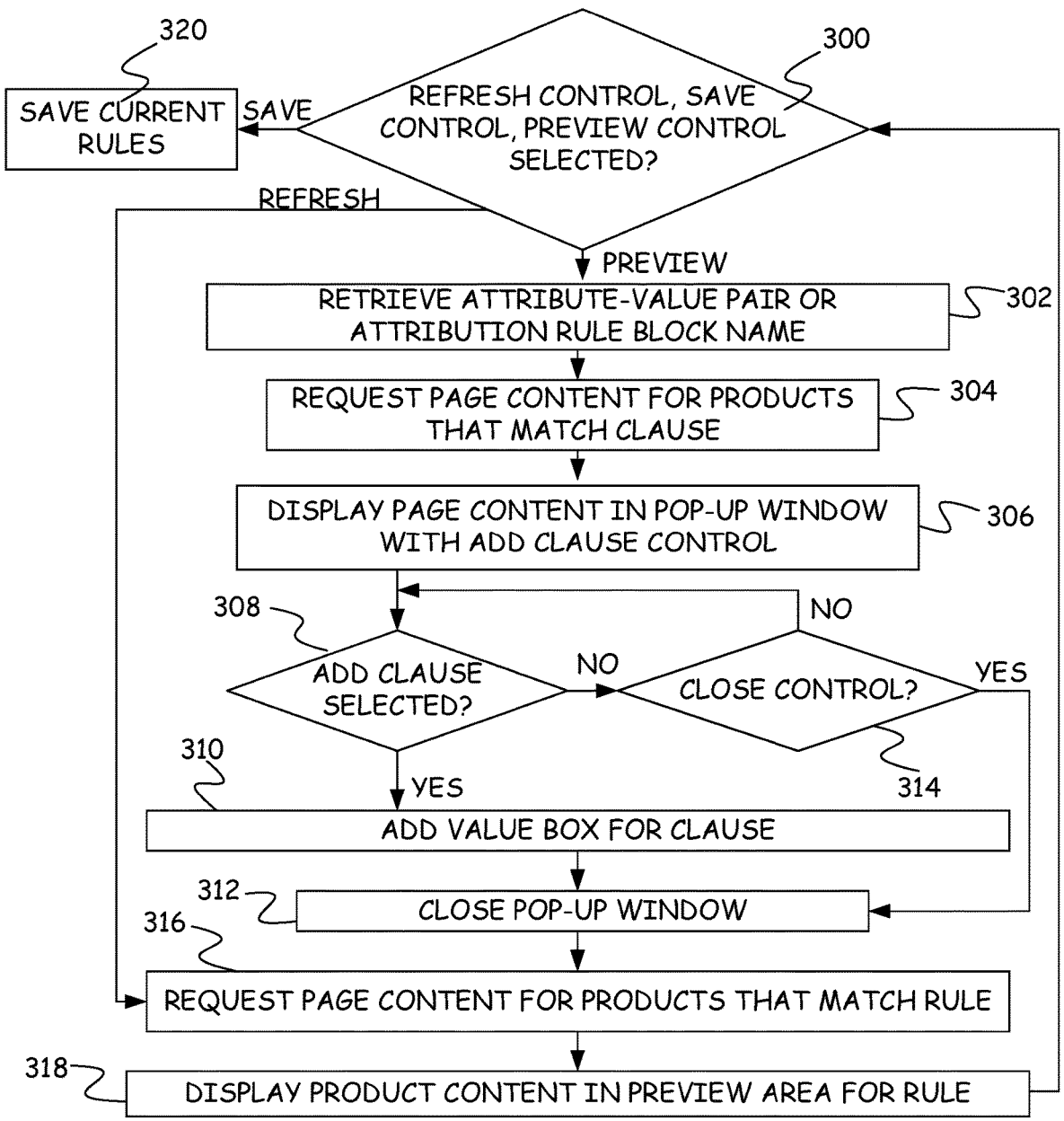
FIG. 3 is a flow diagram of a method of processing rule edits.

Attribution builder 112 processes the rule edits made in preview clause pane 408 at step 204. For example, selection of preview control 430 causes attribution builder 112 to process the rule edits. FIG. 3 provides a flow diagram of a method of processing rule edits at step 204.

In step 300, attribution builder 112 determines whether save control 422, preview control 430 or a refresh control discussed below were selected. If preview control 430 was selected, attribution builder 112 retrieves the attribute-value pair or attribution rule block name set in preview clause pane 408 at step 302. At step 304, attribution builder 112 provides the attribute-value pair or the attribution rule block name to a preview builder 116 of FIG. 1, which then requests product content for products that match the attribute-value pair or the attribution rule block. For an attribution rule block, preview builder 116 retrieves the rules defined for the attribution rule block from stored attribution rule blocks 140 and then sends a request to a search service 118 in a search server 120 for page content for products that match the retrieved rules. For an attribute-value pair, preview builder 116 sends a request to search service 118 for page content for products that match the attribute-value pair. Search service 118 searches a product data store 122 to look for product entries 126 that have attributes 128 that match the attributes designated by the retrieved rule block or by the attribute-value pair. For each product entry 126 with matching attribute values, search service 118 retrieves the page content 130 for the product entry 126, where the page content can include an image of the product, a name of the product, a price of the product and a description of the product, for example. Search service 118 returns the page content of all of the matching products to preview builder 116, which forwards the content to attribution builder 112. At step 306, attribution builder 112 generates a pop-up window on user interface 114 that includes the page content for the products that match the clause and an ADD CLAUSE control that can be used to add the clause to the rule for the webpage.

Figure 5:
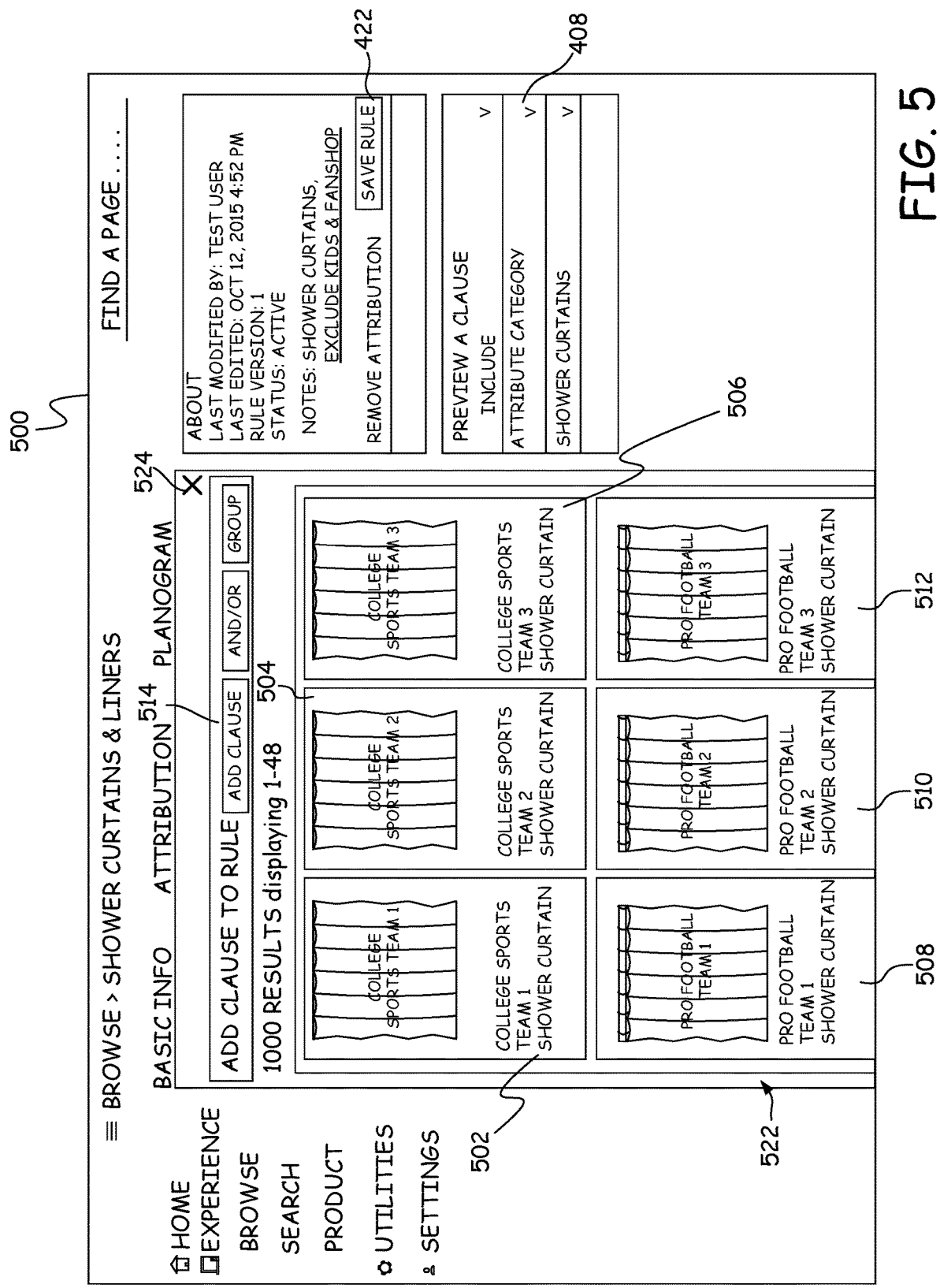
FIG. 5 is the user interface of FIG. 4 showing a preview of products that will be returned in response to the entered clause.

FIG. 5 provides an example of a user interface 500, which is formed by modifying user interface 400 based on the selection of preview control 430 of FIG. 4 and the processing of steps 302, 304, and 306 of FIG. 3. In FIG. 5, a pop-up window 522 is displayed over user interface 400 of FIG. 4. Pop-up window 522 includes page content 502, 504, 506, 508, 510 and 512 for products that match the clause in preview clause pane 408. User interface 500 also includes ADD CLAUSE control 514. If ADD CLAUSE control 514 is selected at step 308 of FIG. 3, a value box for the clause is added to the user interface at step 310. User interface 500 also includes and AND/OR control that allows the designer to designated if the clause should be added as a logical AND or a logical OR to the existing clauses and a GROUP control that allows the user to designate which group of clauses in the rule this clause is to be added to. At step 312, pop-up window 522 is closed so that it is removed from user interface 500.

Figure 6:
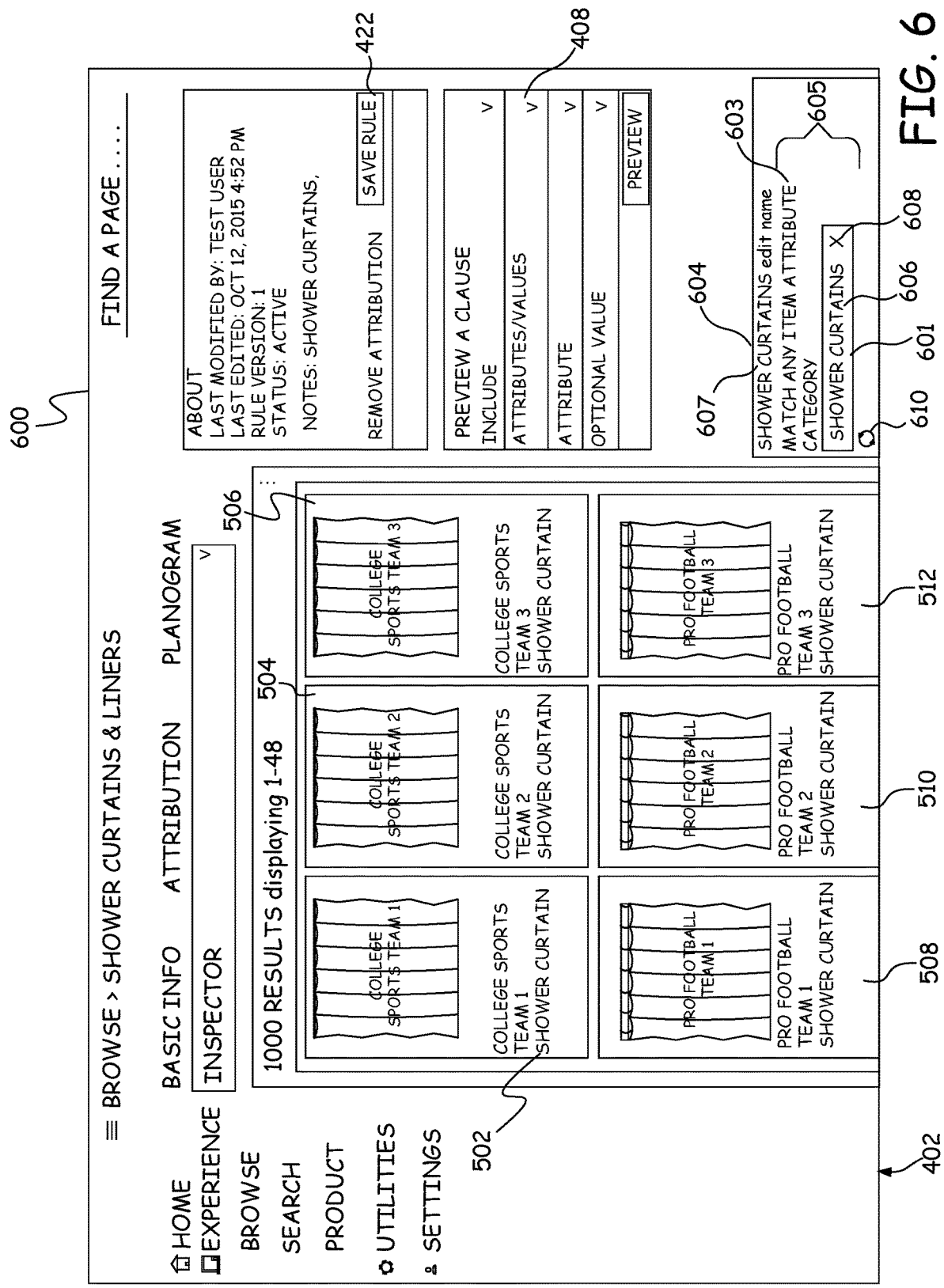
FIG. 6 is the user interface of FIG. 5 after the user has added the clause to the rules for the webpage.

FIG. 6 provides an example user interface 600 showing the modification to user interface 500 when ADD CLAUSE control 514 is selected. In FIG. 6, pop-up window 522 has been removed and a rule box 604 has been added. Rule box 604 contains a description of one rule that has been added to the webpage and includes a rule name 607 and a rule definition 605. Rule definition 605 includes relationship/attribute text 603 that describes the relationship, Include or Exclude, of the rule and the attribute type for the rule. Rule definition 605 also includes one or more value boxes such as value box 601, which each identify an attribute value for the rule. Each value box 601 includes the value itself 606 and a delete control 608 that can be used to remove the attribute value from the rule. In accordance with one embodiment, rule definition 605 can be expanded by including further value boxes representing further values for the attribute type relationship/attribute text 603. Rule box 604 can be expanded to include further rule definitions.

If the ADD CLAUSE control is not selected at step 308, the process of FIG. 3 continues at step 314 where it determines if the close control 524 for the pop-up window was selected. If the close control was selected, the pop-up window is closed at step 312 without adding the clause to the rule.

After the pop-up window is closed, the page content for the products that match the current version of the rule is requested at step 316. The page content for the products that match the rule is requested using preview builder 116 and search service 118 in the same manner as is explained above for the preview of the clause. The only difference is that the combined rule is sent to search service 118 instead of only a single clause. At step 318, the page content for the products that are returned for the rule are displayed in a preview area 402 of user interface 114.

User interface 600 shows the page content returned for the rule shown in FIG. 6 in preview area 402. The page content includes content 502, 504, 506, 508, 510 and 512 for six of the one thousand products that match the rule. Additional content can be viewed by scrolling down through the returned content.

After updating the content shown in preview area 402, the process of FIG. 3 returns to step 300. User interface 600 also includes a refresh control 610, which when selected at step 300 causes steps 316 and 318 to be repeated such that product content for products that match the rule for the page is retrieved from product data store 122 and is displayed in preview area 402. Thus, refresh control 610 operates in a similar fashion to preview control 430 but instead of operating on a single clause, refresh control 610 operates on the entire rule for the webpage. Refresh control 610 can be used after one or more value boxes have been deleted using delete control 608 to determine how the page content will change. Refresh control 610 can also be used when the designer believes additional products have been added to product data store 122 or when the designer believes products have been removed from data store 122, for example.

At step 300, the designer can also select save control 422. When save control 422 is selected, the current rule for the page is saved as attribution rules 110 in page attributes 106 at step 320. Note that if the clause in preview clause pane 408 has not been added to the rule, it will not be saved as part of the rule at step 320.

Figure 7:
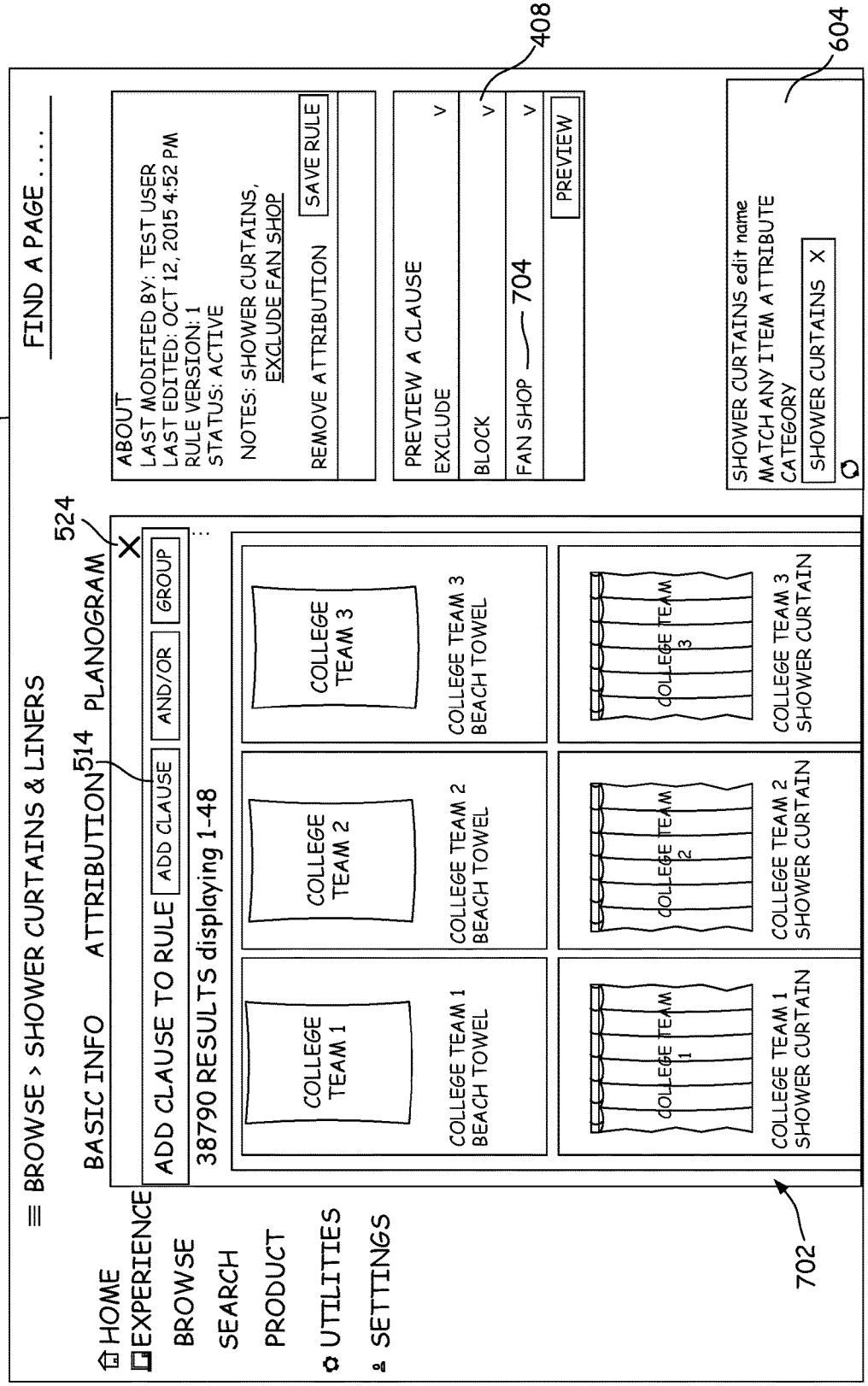
FIG. 7 is the user interface of FIG. 6 after a preview button has been selected for the addition of an attribution rule block clause.

When constructing a rule clause, the webpage designer is able to incorporate a previously defined rule, known as an attribution rule block, into the rules for the page. FIG. 7 provides an example of a user interface 700 showing a pop-up window 702 with a preview of page content that is returned for products that match attribution rule block 704, FAN SHOP, selected in preview clause pane 408.

As discussed above, attribution rule block 704 is one of stored attribution rule blocks 140. Attribution rule blocks 140 are constructed using an attribution rule block builder 142, which generates attribution rule block user interfaces 144. A webpage designer can use website design client device 102 to construct attribution rule blocks through attribution rule block user interfaces 144.

Figure 8:
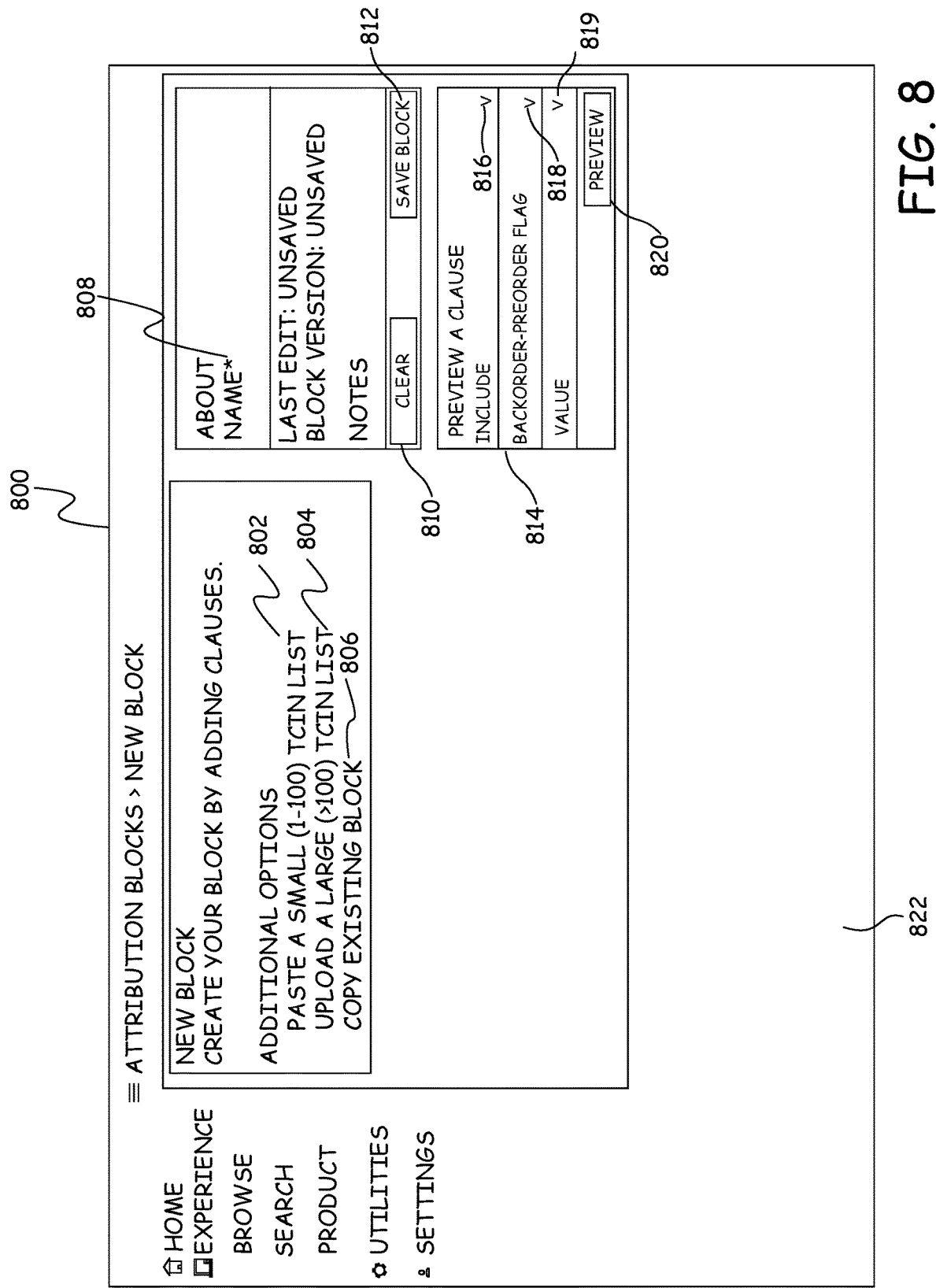
FIG. 8 is a user interface for constructing a new attribution rule block.

FIG. 8 provides an example user interface 800, which is one example of an attribution rule block user interface 144. User interface 800 is a new rule block user interface that allows a new rule block to be defined. In user interface 800, three controls 802, 804 and 806 are provided for defining the products to be included in the attribution rule block. Control 802 is used to paste a small list of product identifiers to create the attribution rule block, control 804 is used to upload a large list of product identifiers and control 806 is used to copy an existing attribution block as the starting point for defining the new attribution block. User interface 800 also includes name field 808, which receives a name for the attribution rule block, a clear control 810 that will clear all the information added to the attribution rule block and a save block control 812 that will save the attribution rule block. A preview clause pane 814 includes relationship control 816, mech type attribute control 818 and value control 819, which can be used to define a rule that either includes or excludes products that match a particular attribute-value pair. A preview control 820 is provided that when selected will cause a pop-up window containing page content for products that match the attribute-value pair of preview clause pane 814 to be displayed. The process for generating the pop-up window is the same as that described above for pop-up window 522.

FIG. 9 provides an example user interface 900, which is another example of an attribution rule block user interface 144. User interface 900 provides a list of previously saved attribution rule blocks 140 and indicates a name 902, a utilization 904, a modification date 906 and a modifier 908 for each attribution rule block. Utilization 904 indicates the number of webpages that utilize the attribution rule block, the modification date 906 indicates the last date the attribution rule block was modified and the modifier date 908 indicates the person who last modified the attribution rule block. Each of the attribution rule blocks listed in user interface 900 may be selected from user interface 900 to view an attribution rule block edit user interface.

Figure 10:
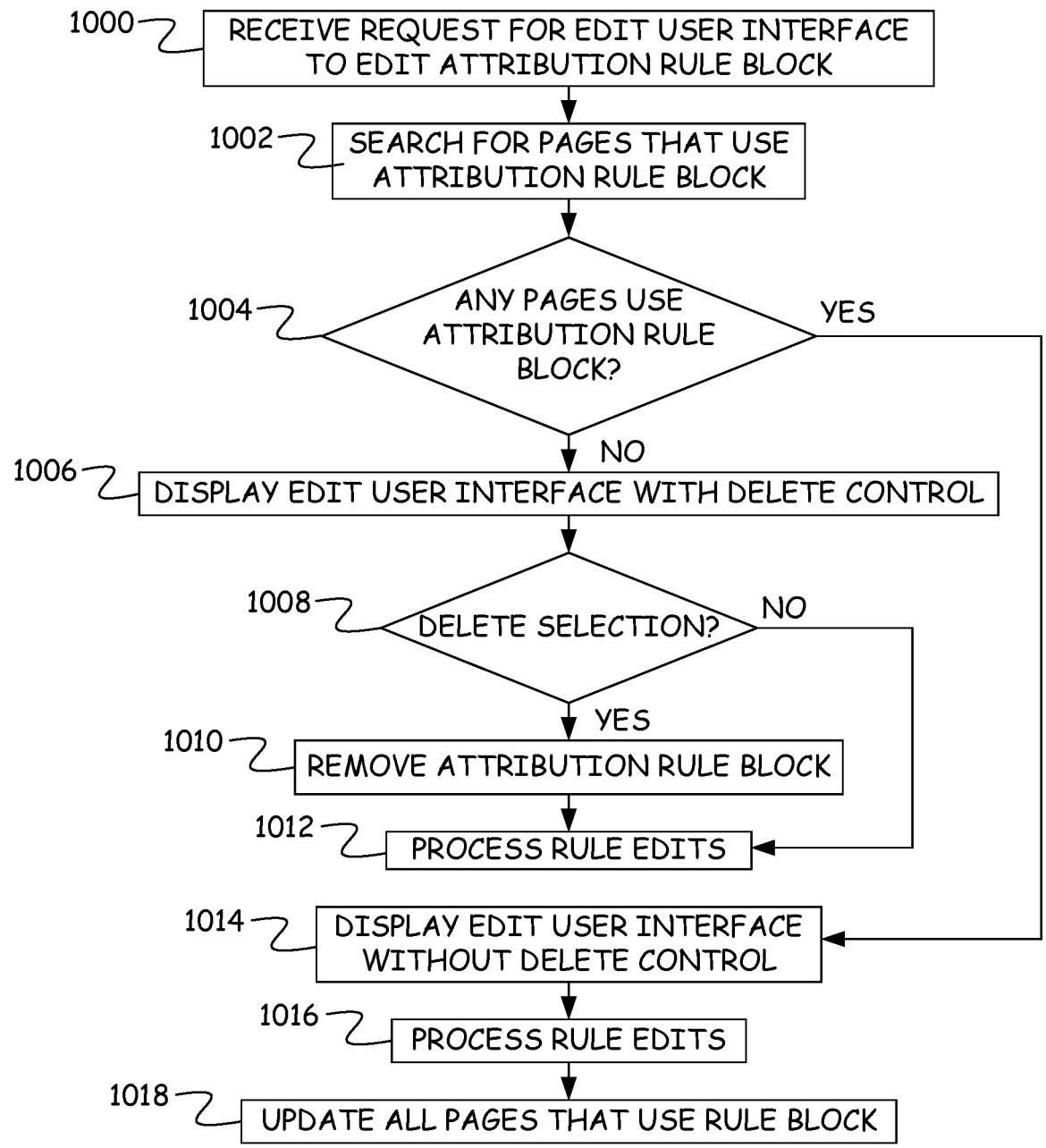
FIG. 10 is a flow diagram for editing an attribution rule block.
Figure 13:
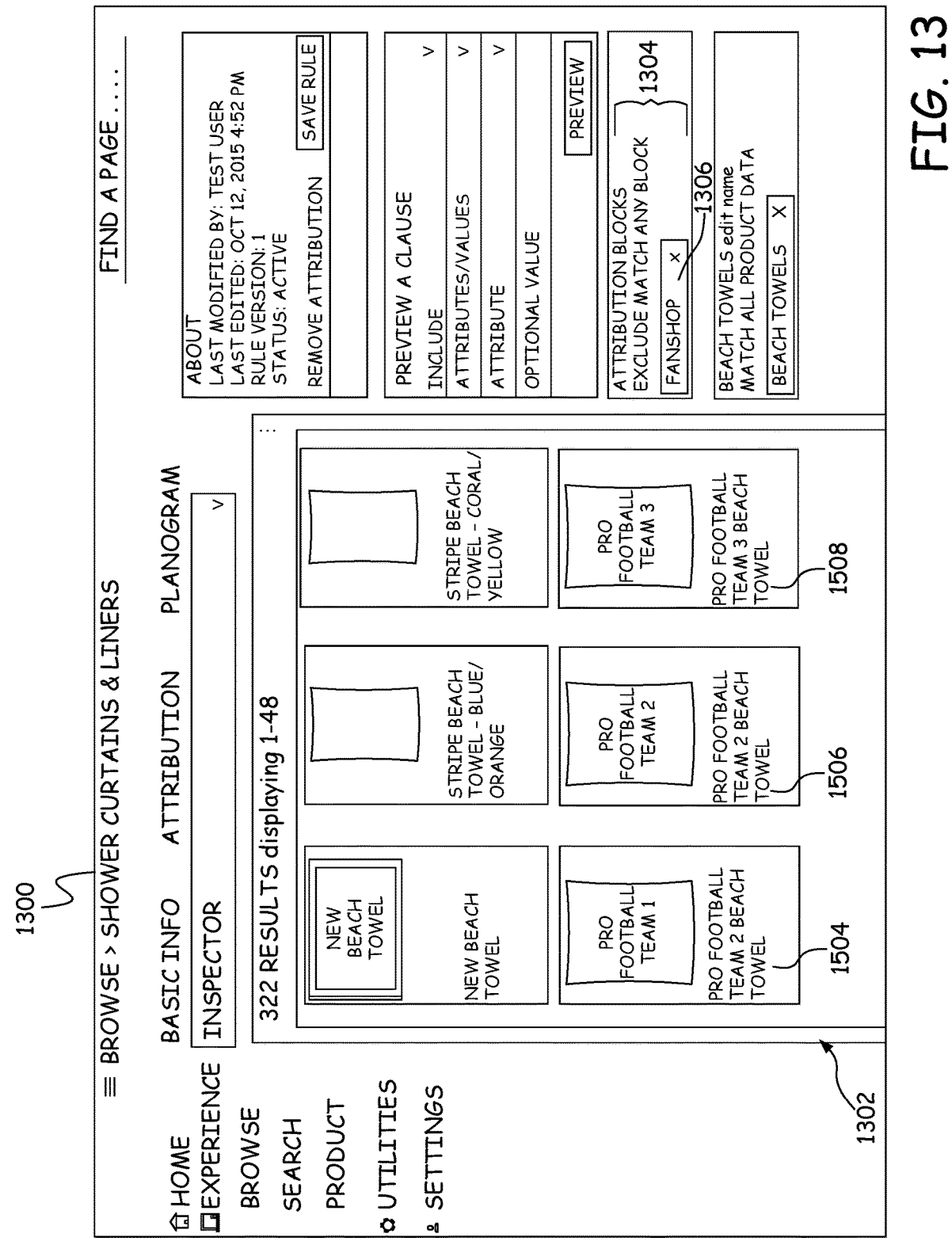
FIG. 13 is an example user interface of a rule that uses the attribution rule block of FIG. 12.

FIG. 10 provides a flow diagram for processing a request to edit an attribution rule block. At step 1000, a request for an edit user interface. At step 1002, attribution rule block builder 142 searches page attributes 106 to identify pages that use the requested attribution rule block. If there are no pages that use the attribution rule block at step 104, the edit user interface for the attribution rule is displayed with a delete control at step 1006.

An example of an edit user interface with a delete control is shown in FIG. 11. As shown in FIG. 11, delete control 1102 is provided because no page references this rule as indicated by NOT REFERENCED marking 1104. If the delete control is selected at step 1008, the attribution rule block is removed from attribution rule blocks 140 at step 1010. If the delete control is not selected at step 1008, the attribution rule block may be edited and those edits are processed at step 1012 using the method depicted in FIG. 3.

Figure 12:
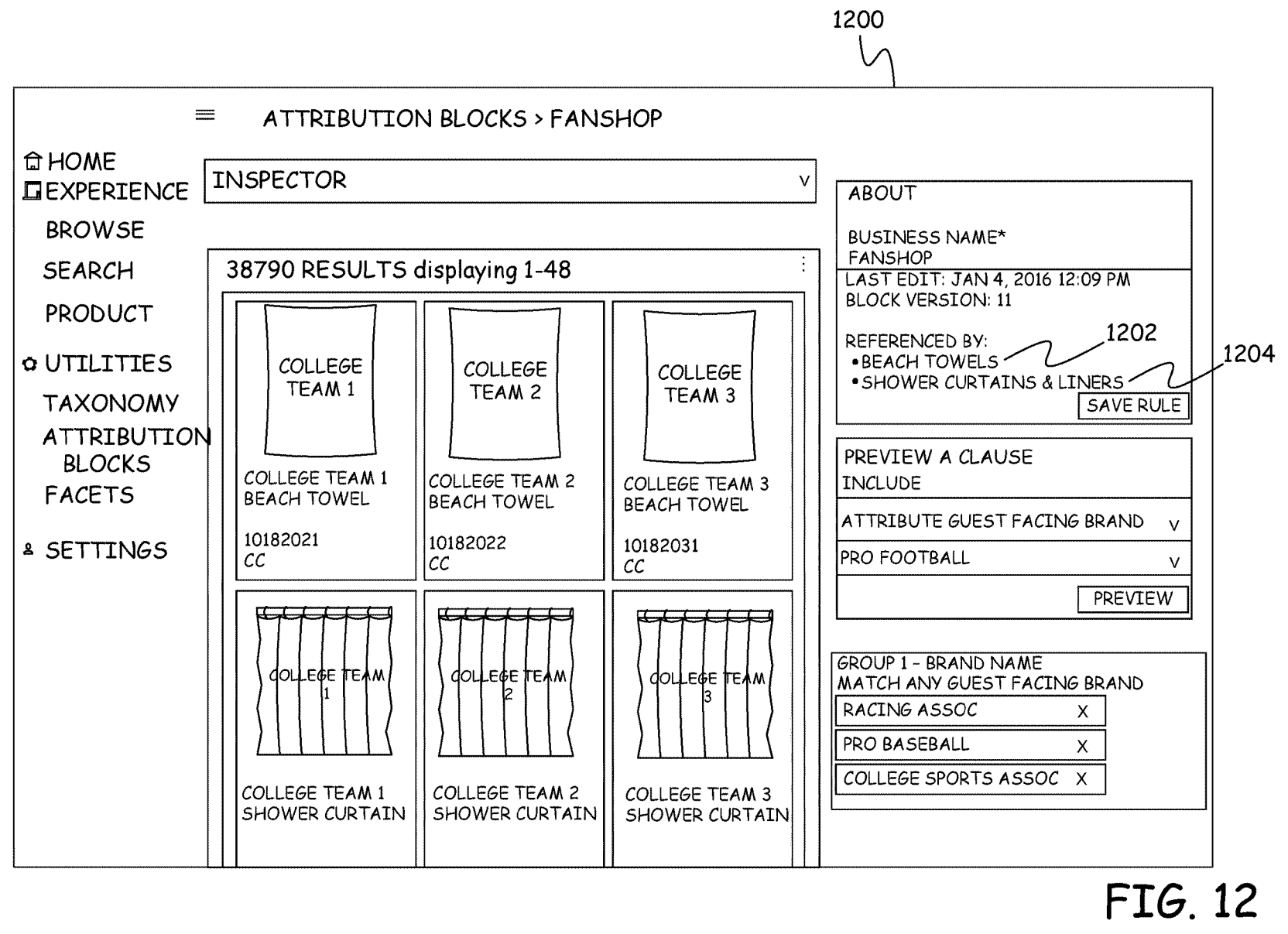

If at least one page uses the attribution rule block at step 1004, an edit user interface is displayed without the delete control at step 1014. FIG. 12 provides an example of an edit user interface 1200 that is displayed without the delete control. As indicated in user interface 1200, the attribution rule block is used by at least two pages 1202 and 1204. Because a delete control is not provided in the edit user interface when at least one page uses the attribution rule block, it is not possible for the attribution rule block to be deleted while it is in use by at least one page. This prevents the construction of pages from failing due to the removal of an attribution rule block that the page requires.

After displaying the edit user interface without the delete control at step 1014, attribution block builder 142 processes rule edits at step 1016 as depicted in FIG. 3.

After an attribution rule block has been changed, all the pages that use the attribution rule block are updated at step 1018 by attribution rule block builder 142. Thus, the page attributes 106 of the pages are altered to reflect the changes to the attribution rule block. In accordance with some embodiments, the alterations to the page attributes 106 triggers product entries 126 to be altered to indicate that the corresponding product is found on pages 160 or that previous pages listed in product entry 126 for a product are to be removed from pages 160.

Figure 14:
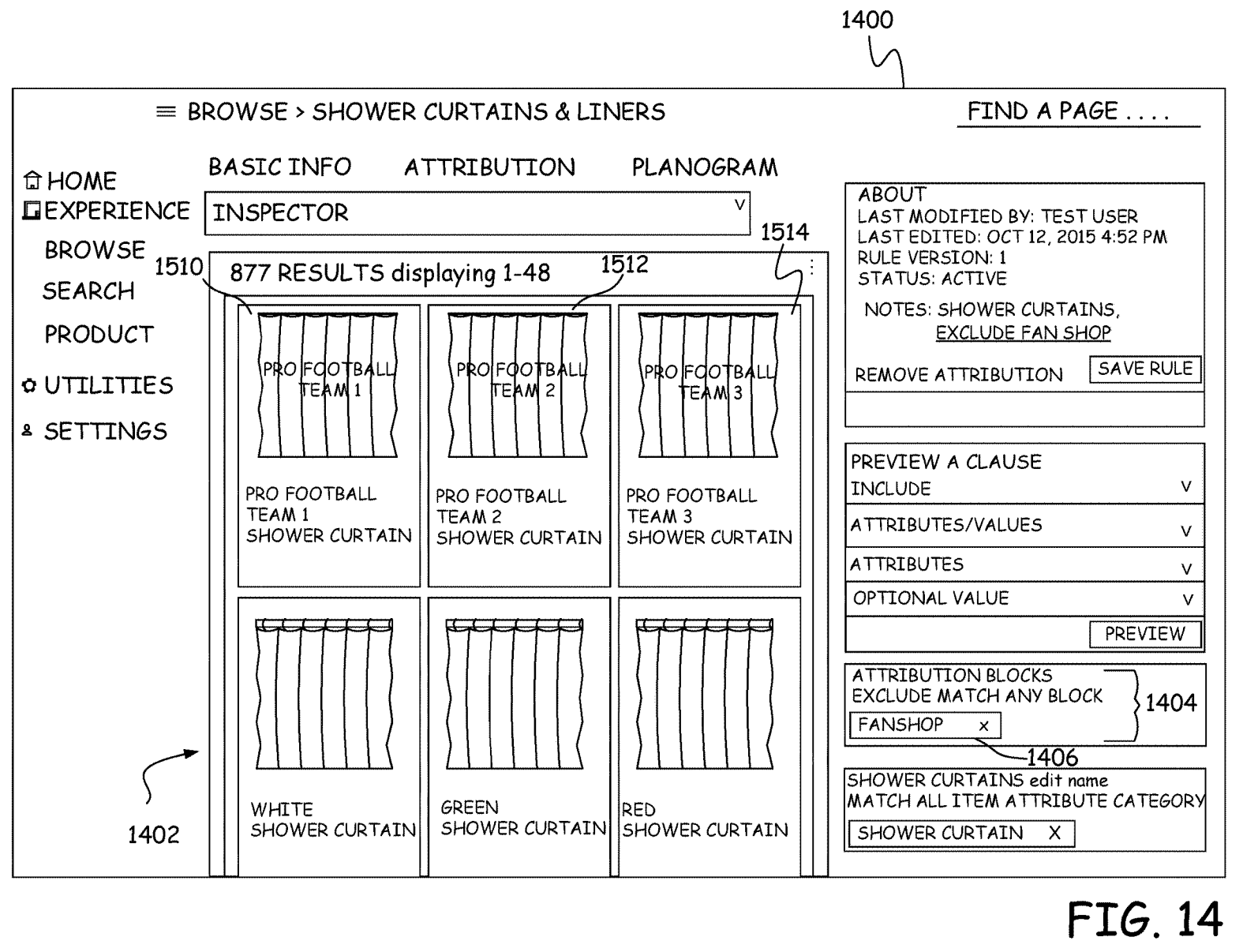

FIGS. 13-18 show how changes to an attribution rule block affect pages that utilize the attribution rule block. In particular, user interfaces 1300 of FIG. 13 and 1400 of FIG. 14 show preview 1302 and 1402 of products returned for two different pages that both use the FANSHOP attribution rule block shown in user interface 1200 of FIG. 12. In particular, in FIG. 13, the page for user interface 1300 includes a rule 1304, which excludes any product in FANSHOP rule block 1306. Similarly, user interface 1400 includes a rule 1404 that excludes any product in FANSHOP rule block 1406. FANSHOP rule blocks 1306 and 1406 both refer to the same fan shop rule block indicated in user interface 1200.

Figure 15:
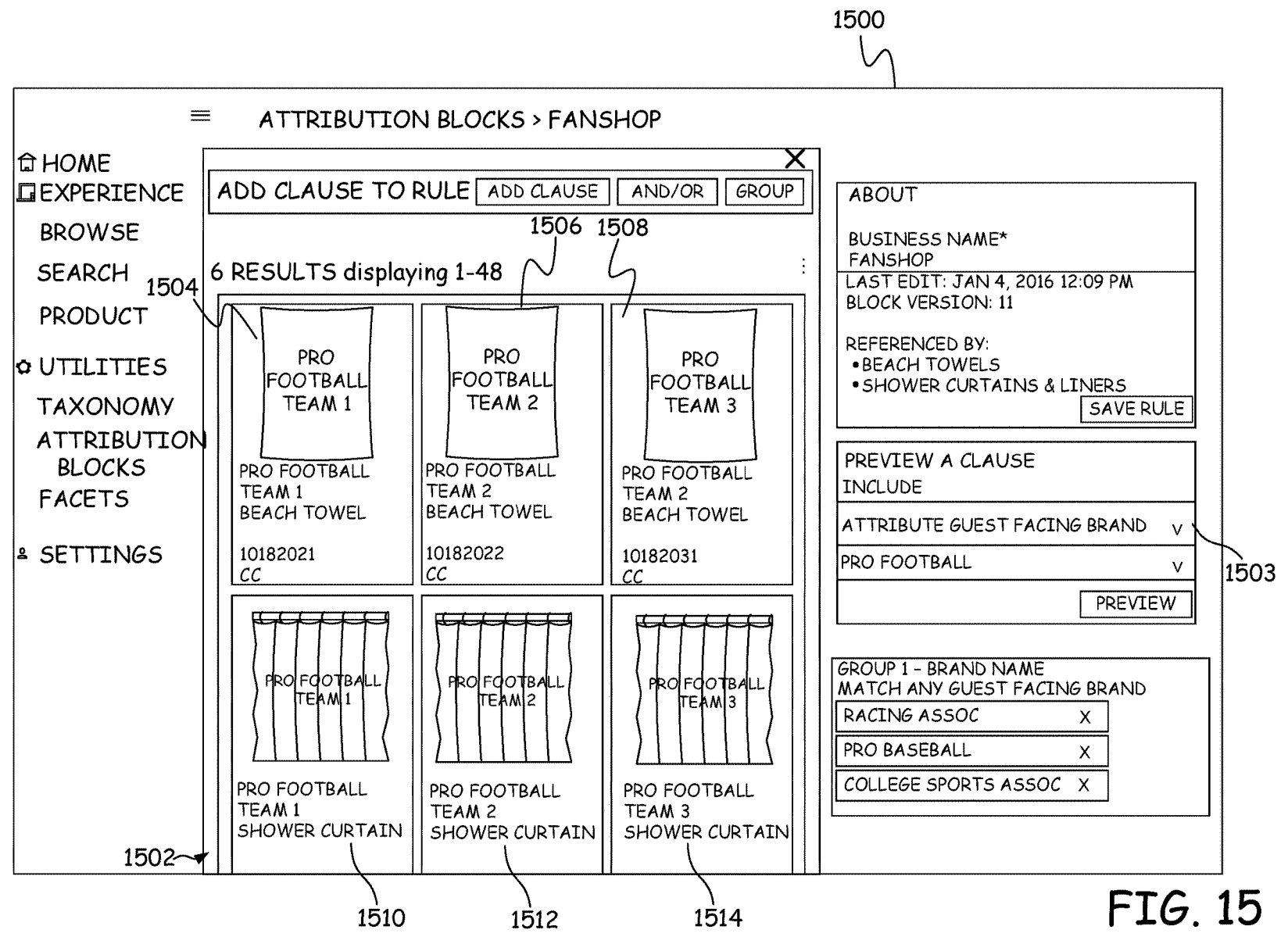

FIG. 15 shows an example user interface 1500 showing a preview pop-up window 1502 showing six additional products that would be returned if the clause shown in preview clause pane 1503 were added to the FANSHOP rule block of FIG. 12. In preview clause pane 1503, the new clause would include all products with a guest facing brand of Pro Football.

FIG. 16 provides an example user interface 1600 showing that the clause shown in preview clause pane 1503 of FIG. 15 has been added to the FANSHOP rule block. As a result, a new value box 1602 has been added to rule 1603. This has resulted in a change in preview area 1604 to include the six additional products provided by the new rule. As indicated in FIG. 15, these six new products include three beach towel products 1504, 1506 and 1508 and three shower curtain products 1510, 1512 and 1514.

As noted above, FIGS. 13 and 14 show a preview of the products returned for their respective rules using the version of FANSHOP depicted in FIG. 12 before the addition of the Pro Football value box 1602 shown in FIGS. 15 and 16. Since the version of FANSHOP in FIG. 12 does not include products with the Pro Football brand, the Exclude rules 1304 and 1404 of FIGS. 13 and 14 do not exclude products with the Pro Football brand. As a result, Pro Football beach towels 1504, 1506 and 1508 are returned for the rule of FIG. 13 as shown in preview area 1302 and Pro Football shower curtains 1510, 1512 and 1514 are returned for the rule of FIG. 14 as shown in preview area 1402.

Figure 17:
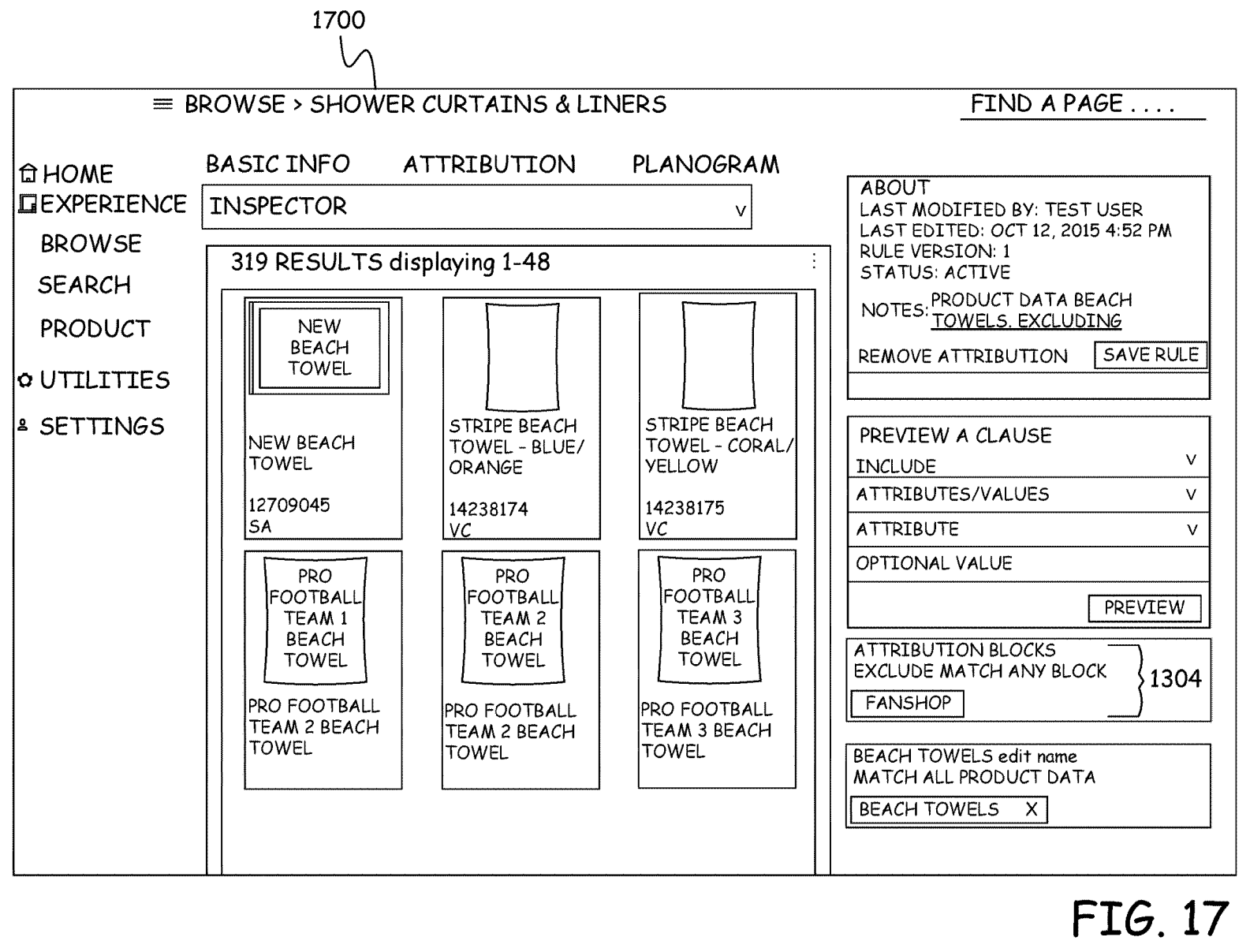

Example user interfaces 1700 of FIG. 17 and 1800 of FIG. 18 show the changes in the page content returned for the rules of user interfaces 1300 and 1400, respectively, when the FANSHOP rule block is modified as shown in FIGS. 15 and 16. In particular, when the FANSHOP rule block is updated to include products with the Pro Football brand as depicted in FIG. 16, the exclusion rules for the pages of user interfaces 1300/1700 and 1400/1800 now exclude products with the Pro Football brand. As a result, pro football beach towels 1504, 1506 and 1508 are not shown in the page associated with user interface 1700 and shower curtains 1404, 1406 and 1408 are not shown on the page associated with user interface 1800. Thus, a change in attribution rule block FANSHOP is propagated through all of the pages that use the attribution rule block without any further changes needed to the rule definitions for the individual pages.

Figure 19:
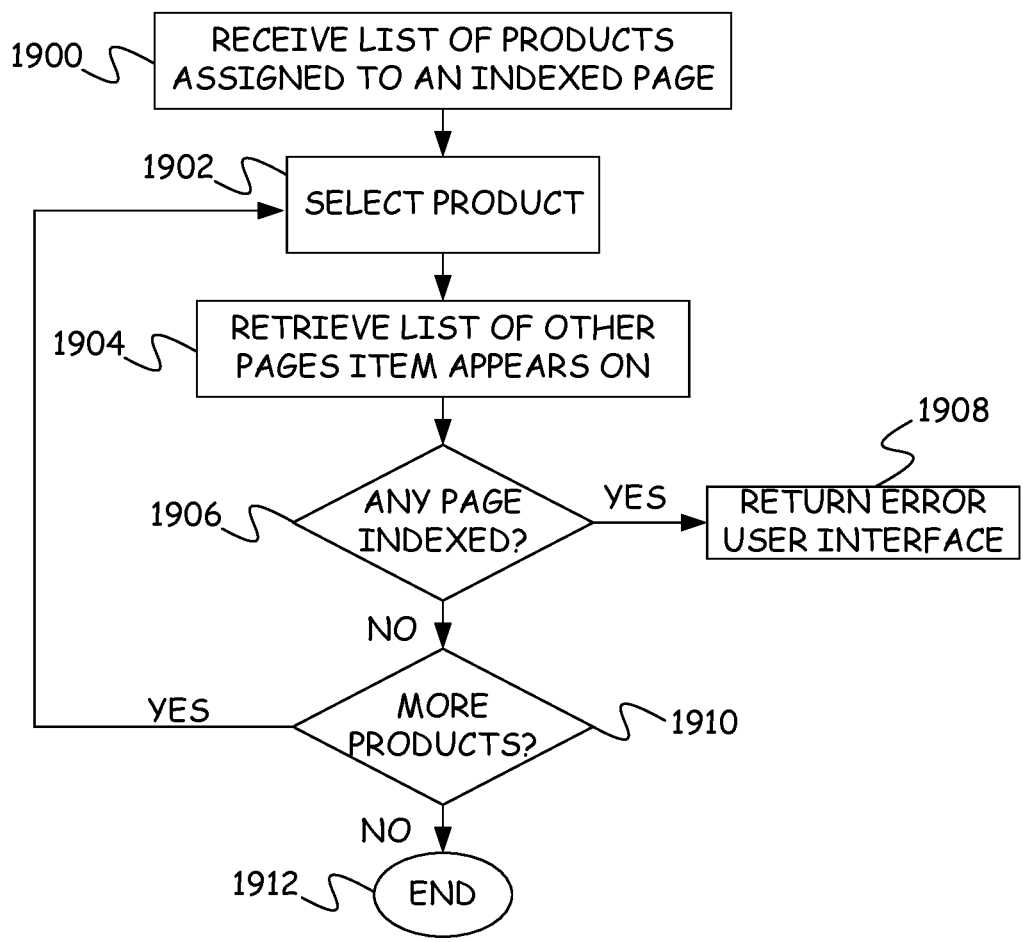

In accordance with one embodiment, the number of pages that a product appears on and that are indexed by a search engine is limited to reduce the number of index pages that a product appears on. This increases the number of "clicks" that a page will receive in search results and thereby increases the ranking of that page on the search results page. FIG. 19 provides a flow diagram of a method of reducing the number of index pages that a product appears on. At step 1900, a list of products assigned to a page is received. This can occur any time the page attributes 106 of a page are altered to change the products that will appear on the page. If the page is an index page, a product from the list of products is selected at step 1902 by a single indexed page checker 150. Single indexed page checker 150 then request the pages 160 that the product appears on from search service 118 at step 1904. Single indexed page checker 150 then examines the page attributes 106 of each returned page to determine if any of the returned pages are indexed at step 1906. If at least one of the other pages that the product appears on is indexed, an error is returned to the user interface a step 1908 indicating that the product should not be included on the current page. If the product does not appear on another indexed page at step 1906, the process determines if there are more products at step 1910. If there are more products for the current page, the process returns to step 1902 to select the next product. When there are no more products, the process ends at step 1912. By providing an error message if a product is being added to an index page when it already exists on another index page, the various embodiments reduce the number of index pages that a product will appear on and thereby improve the ranking of the pages of the website on search engines.

Figure 20:
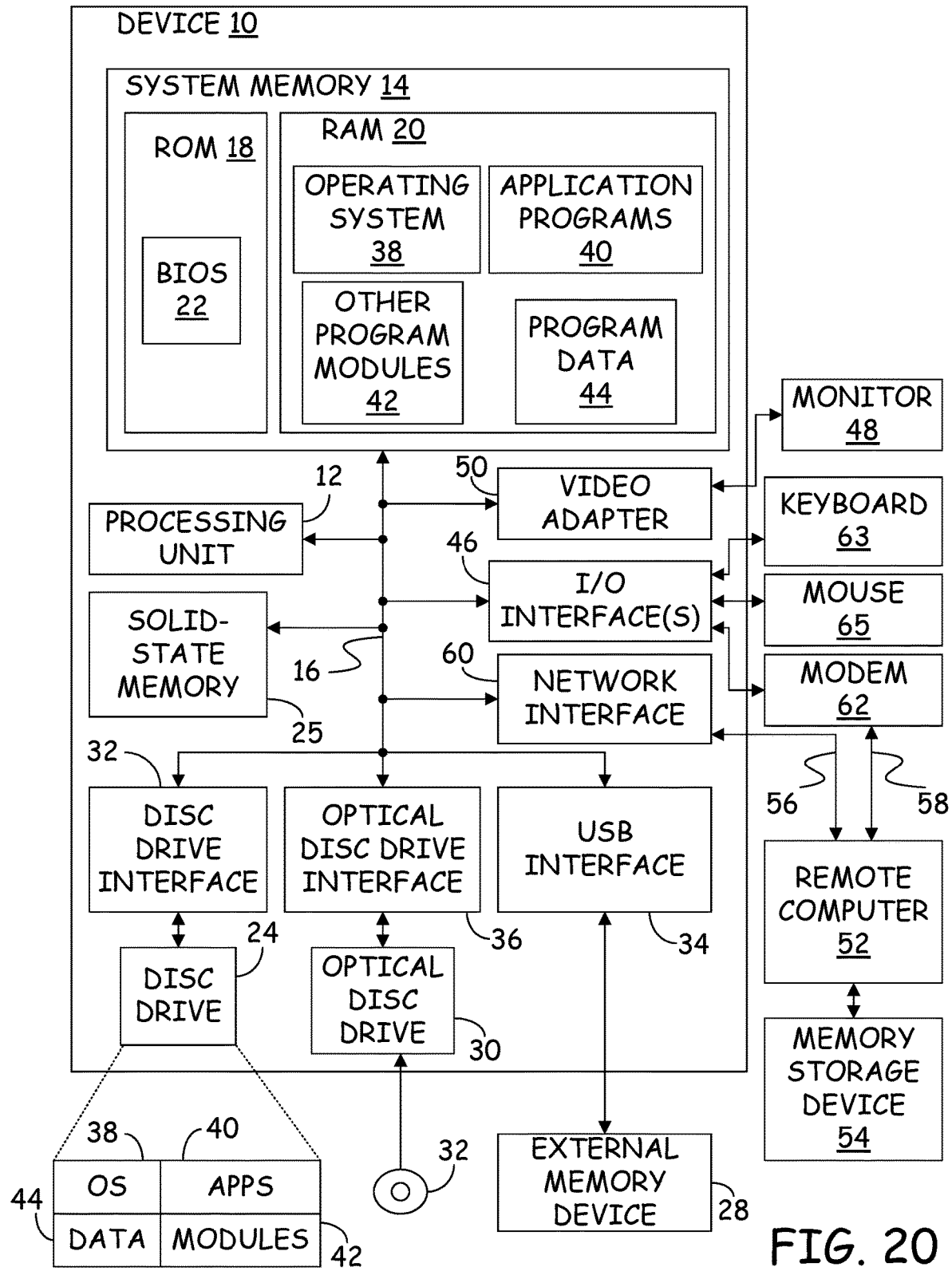
FIG. 20 is a block diagram of a computing device that can be used in the various embodiments.

FIG. 20 provides an example of a computing device 10 that can be used as a server device or client device in the embodiments above. Computing device 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing website design server 104 and search server 120 including programs for implementing taxonomy builder 108, attribution builder 112, preview builder 116, attribution rule block builder 142, single indexed page checker 150, and search service 118, for example. Program data 44 may include data such as attributions rules 110, page attributes 106, attribution rule blocks 140, and product data store 122, for example.

Processing unit 12, also referred to as a processor, executes programs in system memory 14 and solid state memory 25 to perform the methods described above.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 20. The network connections depicted in FIG. 20 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 20 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A computer-implemented method comprising:
retrieving product content for products using a rule assigned to a webpage;
providing a user interface with a rule preview area containing the product content and with controls to form a product selection clause based on a product attribute value and in the alternative based on a previously-defined rule;
providing a preview control on the user interface and receiving a selection of the preview control;
in response to selection of the preview control, using the product selection clause to retrieve separate respective page content for each of a plurality of products;
displaying the retrieved separate respective page content, including an image of at least one of the plurality of products, on the user interface in a clause preview area separate from the rule preview area to indicate which products would be identified by the product selection clause;
wherein the controls to form the product selection clause include a relationship control that determines whether the page content for the plurality of products retrieved using the product selection clause are to be included in the webpage or excluded from the webpage; and
wherein the retrieved separate page content displayed in the clause preview area is the same when the relationship control indicates that the page content for the plurality of products retrieved using the product selection clause are to be included in the webpage as when the relationship control indicates that the page content for the plurality of products retrieved using the product selection clause are to be excluded from the webpage.

2. The computer-implemented method of claim 1 further comprising:
providing a rule editing user interface that allows a second previously defined rule to be modified;
receiving modifications to the second previously defined rule through the rule editing user interface; and
applying the received modifications to the second previously defined rule so that all rules that use the second previously defined rule are modified.

3. The computer-implemented method of claim 1 further comprising preventing the previously defined rule from being deleted if at least one rule uses the previously defined rule.

4. The computer-implemented method of claim 1 further comprising:
receiving a selection of the control to form the product selection clause based on a product attribute value;
wherein each of the plurality of products has the attribute value.

5. The computer-implemented method of claim 1 further comprising:
receiving a selection of the control to form the product selection clause based on a previously-defined rule;
wherein each of the plurality of products is identified through the previously-defined rule.

6. The computer-implemented method of claim 1 wherein the clause preview area comprises an add clause control, wherein when the add clause control is selected, the rule assigned to the webpage is modified to form a modified rule and the product content displayed in the rule preview area is modified based on the modified rule.

* * * * *